Jan. 26, 1954    L. R. WOODWARD ET AL    2,667,362
CORN PLANTER PACKER WHEEL SCRAPER
Filed Sept. 20, 1951

INVENTORS
Leslie R. Woodward
BY Boyd C. Christensen

Sam J. Slotsky
ATTORNEY

UNITED STATES PATENT OFFICE 2,667,362

CORN PLANTER PACKER WHEEL SCRAPER

Leslie R. Woodward, Viborg, and Boyd C. Christensen, Hurley, S. Dak.

Application September 20, 1951, Serial No. 247,438

3 Claims. (Cl. 280—158)

Our invention pertains to a scraper for corn planter packer wheels.

An object of our invention is to provide a scraper in which the scraper blades are resiliently maintained against the sloping surfaces of the planter wheel.

A further object of our invention is to provide a pivoted scraper blade structure whereby the blade will be maintained against either side of the wheel regardless of the irregularities thereon, the blade being suitably pivoted for this purpose.

A further object of our invention is to provide a scraper blade which can be conveniently thrown out of engaged position whereby the wheel can travel in this way.

A further object of our invention is to provide adjustable means whereby the scraper blades can be adjustably positioned to accommodate various diameters of wheels.

A further object of our invention is to provide an arrangement which can be readily attached to standard planter wheels.

Figure 1:
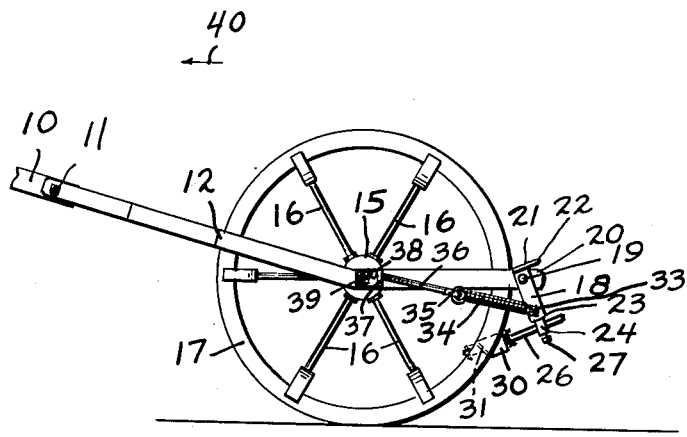
Figure 2:
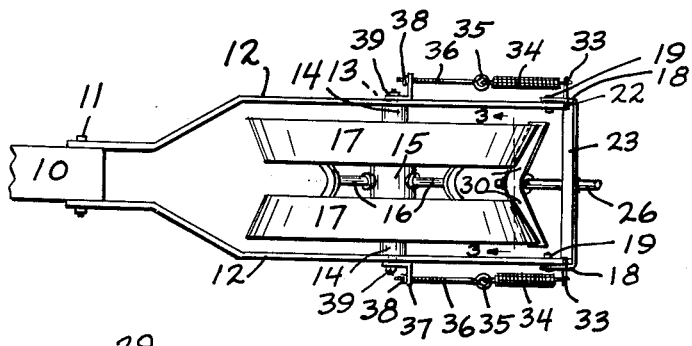
Figure 3:
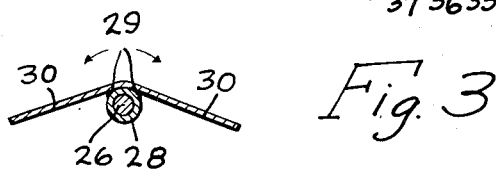
Figure 4:
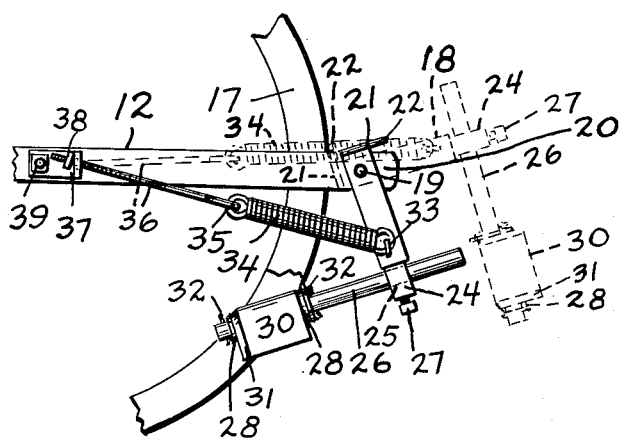

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

Figure 1 is a side elevation of the unit as attached to a corn planter wheel and portions of the structure attached to the wheel, Figure 2 is a plan view of Figure 1, Figure 3 is an enlarged sectional detail taken substantially along the lines 3—3 of Figure 2, and Figure 4 is an enlarged detail.

Our invention contemplates the provision of a scraper unit which can be conveniently attached to standard corn planter packing wheels, and which will provide all of the necessary functions of such scraper units in keeping the wheel clean of mud and the like, regardless of the irregularities in the wheel peripheral surfaces, and to provide the other features as will be apparent from the description.

We have used the character 10 to designate a standard bar portion of a planter unit which is attached at 11 to the yoke members 12, and journalled at 13 within the bearings 14 is a suitable shaft attached to the hub portion 15 of a planter packing wheel having the spokes 16, which are attached to the peripheral packing flanges 17, such flanges 17 sloping inwardly as shown. The bearings 14 are attached to the yoke members 12.

The attachment of our invention includes a U-shaped member having the side portions 18 pivoted at 19 by means of suitable bolts to the ends 20 of the yoke members 12, and attached to the members 18 are the stop members 21 having the inwardly turned portions 22 (see Figure 2).

The U-shaped member includes a transverse portion 23 to which is attached a boss 24 having an opening 25 adapted to receive the cylindrical bar 26, a lock screw 27 serving to lock the bar in selected position.

Freely journalled on the bar 26 is a cylindrical sleeve 28 to which is welded at 29 the scraper blade, which includes the pair of integral portions 30 sloping as shown, the members 30 having the sharpened edges at 31. The sleeve 28 is secured against longitudinal displacement by means of the cotter keys and washers 32. Attached at 33 to the portions 18 are the helical springs 34 which are attached at 35 to the threaded bars 36, which bars 36 pass through the angled keepers 37 and are secured thereat by means of the nuts 38, the keepers 37 being secured at 39 to the yoke portions 12. The U-shaped members 18 and 23 can be mounted at 19 in the same position occupied by the commonly used type of scraper if such is desired, and the mounting at 39 can be made to the yokes 12.

The scraper operates in the following manner. As the wheel is drawn forwardly in the direction of the arrow 40, it will be noted that the scraper unit will be approximately as shown in Figure 1, with the cleaning edges 31 being applied uniformly against the members 17 and at the same angle, whereby the continued rotation will clean off these members very efficiently. It will be also noted that due to the fact that the members 30 can pivot on the bar 26, that even when the high points on one surface 17 are encountered, the pivotal action will allow the blade to follow these high points or low points, this pivotal action allowing the blade surfaces to accommodate both members 17. The surfaces 17 in these type of wheels practically always become uneven due to the nature of the service to which they are put, our invention thereby serving to follow any type of contour.

It will be further noted that the springs 34 exert a constant tension against the blades due to the off-center attachment thereof.

By loosening the set screw 27, the rod can be adjusted inwardly or outwardly so that the blades will accommodate larger diameter wheels and still allow for approximately the same angularity of the members 30 with respect to the blade peripheral surfaces.

It will be noted from Figure 1 that the cutting or cleaning action of the blade edges is applied below the horizontal center line of the wheel, so that the angle of application is at a more efficient position.

The tension of the springs 34 can be adjusted by means of the nuts 38 by turning these nuts along the threaded rods 36. When it is desired to transport the planter without having the scraper blades in operative position, the bar 23 is raised, swinging the U-shaped member about the pivots 19 until the arrangement snaps past the pivots 19 in an off-center manner as shown by the dotted structure Figure 4, whereby the stop members 22 will abut against the members 12, the unit being held in the position shown by the dotted lines, whereby the planter unit can be transported.

It will now be seen that we have provided the various advantages set forth in the objects of our invention with various other advantages being readily apparent.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

1. In combination with a corn planter packer wheel and the yoke in which said wheel is journalled, a substantially U-shaped member pivotally secured at the ends of said yoke, a scraper blade having a pair of angularly inclined scraping portions pivotally secured to said U-shaped member adapted to bear against said planter wheel angular surfaces, means for adjustably securing said scraper blade to said U-shaped member to accommodate the same to various diameters of planter wheels, said U-shaped member being normally at an angle to said yoke, springs attached between said U-shaped member and said yoke whereby said scraper blade will be resiliently urged against said wheel.

2. In combination with a corn planter packer wheel and the yoke in which said wheel is journalled, a substantially U-shaped member pivotally secured at the ends of said yoke, a scraper blade having a pair of angularly inclined scraping portions pivotally secured to said U-shaped member adapted to bear against said planter wheel angular surfaces, means for adjustably securing said scraper blade to said U-shaped member to accommodate the same to various diameters of planter wheels, said U-shaped member being normally at an angle to said yoke, springs attached between said U-shaped member and said yoke whereby said scraper blade will be resiliently urged against said wheel, said adjustable and pivotal means including a rod attached to said U-shaped member, a sleeve attached to said scraper blade receiving said rod to permit free pivoting movement of said blade according to the contours in either wheel surfaces.

3. In combination with a corn planter packer wheel and the yoke in which said wheel is journalled, a substantially U-shaped member pivotally secured at the ends of said yoke, a scraper blade having a pair of angularly inclined scraping portions pivotally secured to said U-shaped member adapted to bear against said planter wheel angular surfaces, means for adjustably securing said scraper blade to said U-shaped member to accommodate the same to various diameters of planter wheels, said U-shaped member being normally at an angle to said yoke, springs attached between said U-shaped member and said yoke whereby said scraper blade will be resiliently urged against said wheel, said adjustable and pivotal means including a rod attached to said U-shaped member, a sleeve attached to said scraper blade receiving said rod to permit free pivoting movement of said blade according to the contours in either wheel surfaces, said U-shaped member including stop members attached thereto to provide means for limiting upward movement of said U-shaped member and said scraper blade when said wheel-engaging blade is resiliently urged out of wheel-engaging position.

LESLIE R. WOODWARD.
BOYD C. CHRISTENSEN.

References Cited in the file of this patent

UNITED STATES PATENTS

| Number | Name | Date |
|---|---|---|
| 778,123 | Fetzer | Dec. 20, 1904 |
| 1,460,236 | Ford | June 26, 1923 |
| 1,685,385 | White | Sept. 25, 1928 |
| 2,454,002 | Paluck | Nov. 16, 1948 |
| 2,571,285 | Oehler | Oct. 16, 1951 |